United States Patent [19]

Anezaki

[11] Patent Number: 5,303,243
[45] Date of Patent: Apr. 12, 1994

[54] NETWORK MANAGEMENT SYSTEM CAPABLE OF EASILY SWITCHING FROM AN ACTIVE TO A BACKUP MANAGER

[75] Inventor: Akihiro Anezaki, Tokyo, Japan

[73] Assignee: NEC Corporation, Tokyo, Japan

[21] Appl. No.: 665,275

[22] Filed: Mar. 6, 1991

[30] Foreign Application Priority Data

Mar. 6, 1990 [JP] Japan .................................. 2-54159

[51] Int. Cl.$^5$ ........................................... G06F 11/00
[52] U.S. Cl. .................................... 371/9.1; 395/575; 371/11.3
[58] Field of Search .................. 371/9.1, 8.1, 7, 11.3; 395/575; 364/268, 240.8, 940.71

[56] References Cited

U.S. PATENT DOCUMENTS

| | | | |
|---|---|---|---|
| 4,141,066 | 2/1979 | Keiles | 371/9.1 X |
| 4,511,958 | 4/1985 | Funk | 395/575 |
| 4,751,702 | 6/1988 | Beier et al. | 371/9.1 |
| 4,775,976 | 10/1988 | Yokoyama | 371/9.1 |
| 4,879,716 | 11/1989 | McNally et al. | 371/8.2 |
| 5,148,433 | 9/1992 | Johnson et al. | 371/11.3 |

Primary Examiner—Robert W. Beausoliel, Jr.
Assistant Examiner—Ly V. Hua
Attorney, Agent, or Firm—Foley & Lardner

[57] ABSTRACT

In a network system comprising first through N-th agents, each of which performs a management operation on a management object (N representing a predetermined natural number which is not less than two), an active manager for managing the first through the N-th agents, and a backup manager for managing the first through the N-th agents when a fault occurs in the active manager, the active manager includes a fault detecting unit for detecting the fault in the active manager to produce a fault detection signal. Supplied with the fault detection signal, the backup managing process delivers a name signal representative of a backup manager name assigned to the backup manager as an indicated name to the first through the N-th agents through backup transmitting/receiving unit and the circuit switching device. In each of the first through the N-th agents, an agent process stores, as a stored manager name, the indicated name in a memory unit on reception of the name signal.

2 Claims, 4 Drawing Sheets

NETWORK MANAGEMENT SYSTEM CAPABLE OF EASILY SWITCHING FROM AN ACTIVE TO A BACKUP MANAGER

BACKGROUND OF THE INVENTION

This invention relates to a networks management system including a plurality of agents and, in particular, to a network management system for switching a manager for managing the agents from an active one to a backup one, when a fault occurs in the active manager.

A network management system comprises first through N-th agents each of which carries out a management operation on a management object, where N represents a predetermined natural number which is not less than two, an active manager for managing the first through the N-th agents, and a backup manager for managing the first through the N-th agents, when a fault occurs in the active manager.

In prior art, a change from the active manager to the backup manager is carried out by using a changing device. More specifically, the changing device physically changes the active manager into the backup manager so as to change the connection of signal lines of the first through the N-th agents from the active manager to the backup manager, when the fault occurs in the active manager. Therefore, such a conventional method of changing from the active manager to the backup manager is called a physical changing method. The physical changing method is expensive. In addition, the physical changing method is incapable of easily switching from the active manager to the backup manager.

SUMMARY OF THE INVENTION

It is an object of this invention to provide a network management system which is not expensive.

It is another object of this invention to provide a network management system of the type described, which is capable of easily switching a manager from an active one to a backup one.

On describing the gist of an aspect of this invention, it is possible to understand that a network management system comprises first through N-th agents, each of which carries out a management operation object where N represents a predetermined natural number which is not less than two, an active manager for managing the first through the N-th agents, and a backup manager for managing the first through the N-th agents when a fault occurs in the active manager.

According to an aspect of this invention, the above-understood active manager includes fault detecting means for detecting the fault in the active manager to produce a fault detection signal. The backup manager includes delivering means supplied with the fault detection signal for delivering, in response to the fault detection signal, a name signal representative of a backup manager name assigned to the backup manager as an indicated name to the first through the N-th agents. Each of the first through the N-th agents comprises storing means supplied with the name signal for memorizing, as a stored manager name, the indicated name.

DESCRIPTION OF THE PREFERRED EMBODIMENTS

Figure 1:
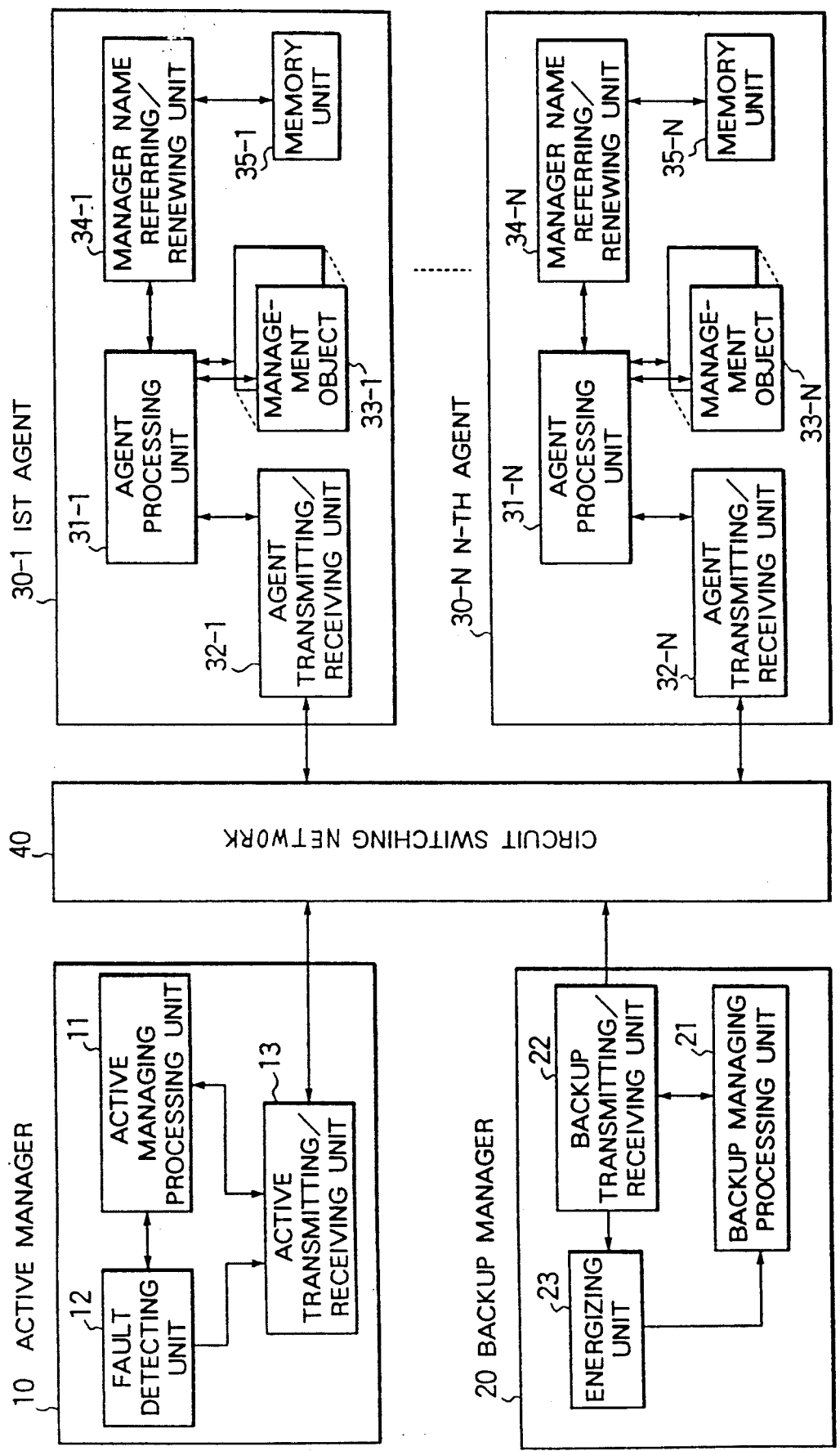
FIG. 1 is a block diagram of a network management system according to an embodiment of this invention.

Referring to FIG. 1, description will begin with a network management system according to an embodiment of the present invention. The network management system comprises an active manager 10, a backup manager 20, and first through N-th agents 30-1 to 30-N, where N represents a predetermined natural number which is not less than two. In the example being illustrated, the active manager 10, the backup manager 20, and the first through the N-th agents 30-1 to 30-N are connected to a circuit switching device 40.

The active manager 10 manages the first through the N-th agents 30-1 to 30-N. The backup manager 20 manages the first through the N-th agents 30-1 to 30-N when a fault occurs in the active manager 10. The active manager 10 is assigned with an active manager name. The backup manager 20 is assigned with a backup manager name.

The active manager 10 comprises an active managing processing unit 11, a fault detecting unit 12, and an active transmitting/receiving unit 13 which are connected to one another. The active transmitting/receiving unit 13 is connected to the circuit switching device 40. The fault detecting unit 12 detects the fault in the active manager 10 to produce a fault detection signal representative of occurrence of the fault. The fault detection signal is delivered towards the backup manager 20 through the active transmitting/receiving unit 13 and the circuit switching device 40.

The backup manager 20 comprises a backup managing processing unit 21, a backup transmitting/receiving unit 22, and an energizing unit 23 which are connected to one another. The backup transmitting/receiving unit 22 is connected to the circuit switching device 40. Supplied with the fault detection signal through the backup transmitting/receiving unit 22, the energizing unit 23 energizes the backup managing processing unit 21. When energized, the backup managing processing unit 21 produces a name signal which represents the backup manager name as an indicated name. The backup managing processing unit 21 delivers the name signal to the first through the N-th agents 30-1 to 30-N through the backup transmitting/receiving unit 22 and the circuit switching device 40. In this manner, the backup managing processing 21 serves in cooperation with the backup transmitting/receiving unit 22 and the energizing unit 23 as a delivering arrangement supplied with the fault detection signal for delivering the name signal to the first through the N-th agents 30-1 to 30-N, whenever the fault detecting unit 12 detects the fault in the active manager 10.

The first agent 30-1 comprises a first agent processing unit 31-1, a first agent transmitting/receiving unit 32-1, a first management object 33-1, a first manager name referring/renewing unit 34-1, and a first memory unit 35-1. The first management object 33-1 comprises a plurality of partial objects. The first agent processing unit 31-1 is connected to the first agent transmitting-/receiving unit 32-1, the first management object 33-1, and the first manager name referring/renewing unit 34-1. The first agent transmitting/receiving unit 32-1 is connected to the circuit switching device 40. The first memory unit 35-1 is connected to the first manager name referring/renewing unit 34-1.

Similarly, the N-th agent 30-N comprises an N-th agent processing unit 31-N, an N-th agent transmitting-/receiving unit 32-N, an N-th management object 33-N, an N-th manager name referring/renewing unit 34-N, and an N-th memory unit 35-N.

In general, an n-th agent 30-n comprises an n-th agent processing unit 31-n, an n-th agent transmitting/receiving unit 31-n, an n-th management object 33-n, an n-th manager name referring/renewing unit 34-n, and an n-th memory unit 35-n, where n is variable between 1 and N, both inclusive.

Supplied with the name signal, each of the first through the N-th memory units 35-1 to 35-N stores the indicated name as a stored manager name in the manner which will later be described. Each of the first through the N-th memory units 35-1 to 35-N preliminarily stores the active manager name as the stored manager name.

The n-th agent processing unit 31-n obtains the stored manager name from the n-th memory unit 35-n by using the n-th manager name referring/renewing unit 34-n on occurrence of particular events, for example, a failure of the n-th management object 33-n and performance threshold over. The n-th agent processing unit 31-n sends an agent management information signal representative of one of the particular events through the n-th agent transmitting/receiving unit 32-n and the circuit switching device 40 to one of the active and the backup managers 10 and 20 that is assigned with the stored manager name. That is, the n-th agent processing unit 31-n acts in cooperation with the n-th manager name referring/renewing unit 34-n and the n-th agent transmitting/receiving unit 32-n as a sending arrangement connected to the n-th memory unit 35-n for sending the agent management information signal to one of the active and the backup managers 10 and 20 that is assigned with the stored manager name.

Operation will briefly be described as regards the network system.

The active manager 10 transmits an active management information signal to the first through the N-th agents 30-1 to 30-N through the circuit switching device 40. The active management information signal includes a control command indicative of a management operation. The n-th agent 30-n carries out the management operation on the n-th management object 33-n in accordance with the control command included in the active management information signal.

Figure 2:
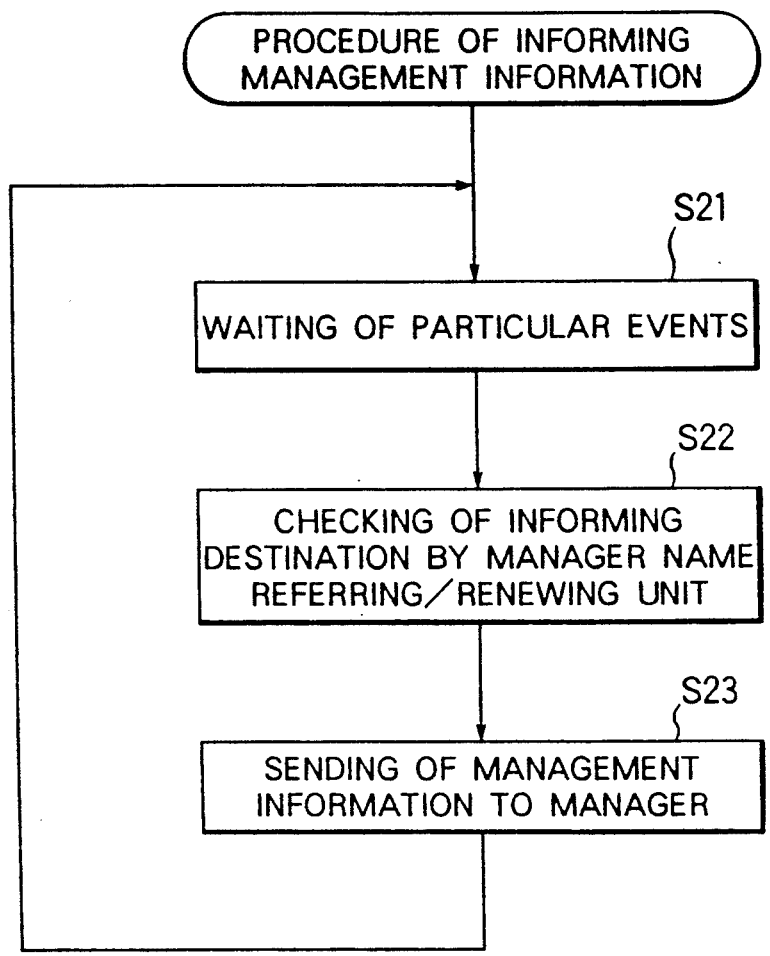
FIG. 2 is a flow chart for describing a management information sending operation of each agent of the network management system illustrated in FIG. 1.
Figure 3:
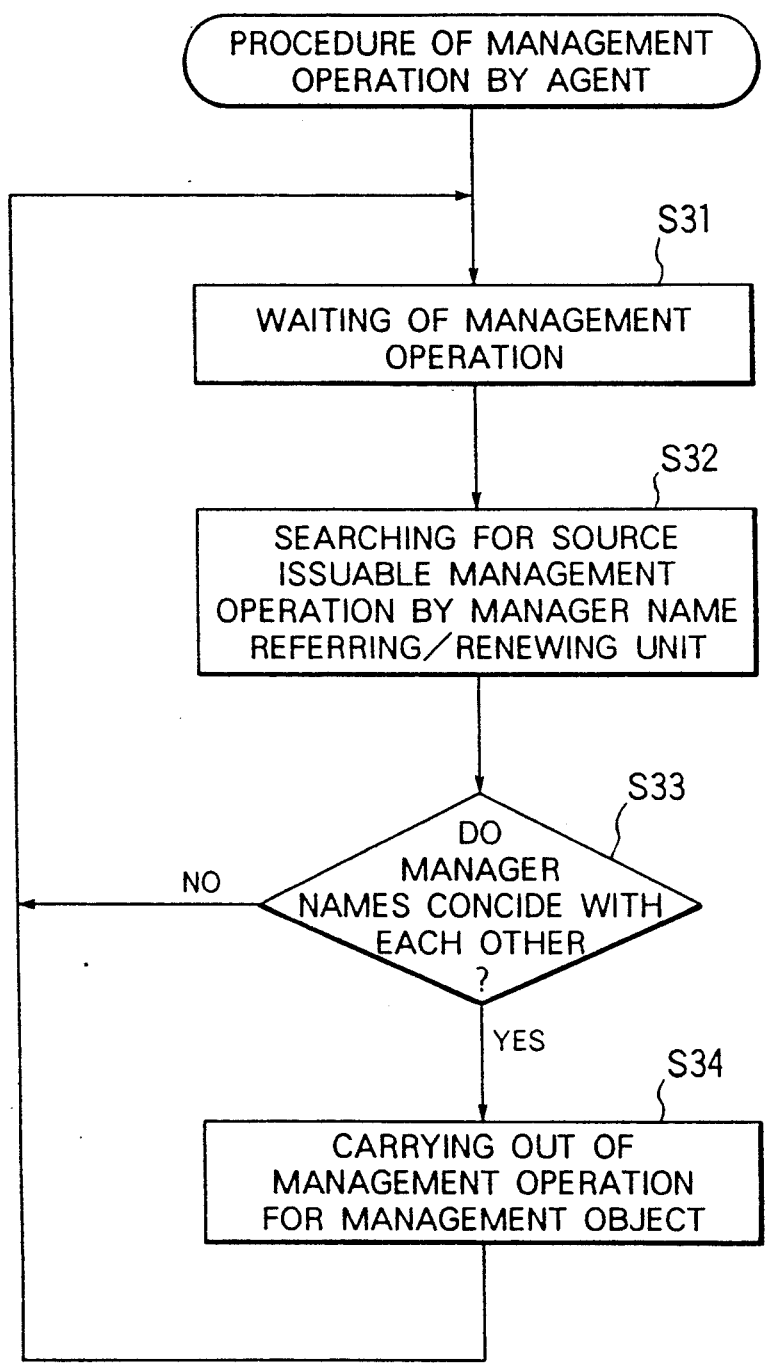
FIG. 3 is a flow chart for describing another operation of each agent on carrying out management operation.

Referring to FIGS. 2 and 3, the description will proceed to operation of the n-th agent 30-n in more detail. With reference to FIG. 2 in addition to FIG. 1, the description will first be made as regards operation of transmitting the agent management information signal.

As shown in FIG. 2, the n-th agent processing unit 31-n wait for the particular events (a step S21). When one of the particular events occurs, the n-th agent processing unit 31-n refers to the n-th memory unit 35-n by using the n-th manager name referring/renewing unit 34-n to obtain the stored manager name (step S22). Subsequently, the n-th agent processing unit 31-n sends the agent management information signal through the n-th agent transmitting/receiving unit 32-n and the circuit switching device 40 to one of the active and the backup managers 10 and 20 which is assigned with the stored manager name (step S23). Under the circumstances, the agent management information signal is sent to the active manager 10. This is because the n-th memory unit 35-n preliminarily stores the active manager name as the stored manager name.

Referring to FIG. 3 in addition to FIG. 1, the description will be made as regards operation of carrying out the management operation.

On reception of the active management information signal including the control command indicative of the management operation, the n-th agent 30-n carries out the management operation on the n-th management object 33-n.

More specifically, the n-th agent processing unit 31-n waits for the active management information signal including the control command indicative of the management operation (step S31). The n-th agent processing unit 31-n refers to the n-th memory unit 35-n by using the n-th manager name referring/renewing unit 34-n to obtain the stored manager name (step S32). The step S32 is followed by a step S33 at which the n-th agent processing unit 31-n judges whether or not the stored manager name coincides with the active manager name assigned to the active manager 10 which delivers the active management information signal. When the stored manager name does not coincide with the active manager name, the step S33 returns back to the step S31. When the stored manager name coincides with the active manager name, the step S33 proceeds to a step S34 at which the n-th agent processing unit 31-n carries out the management operation indicated by the control command.

Figure 4:
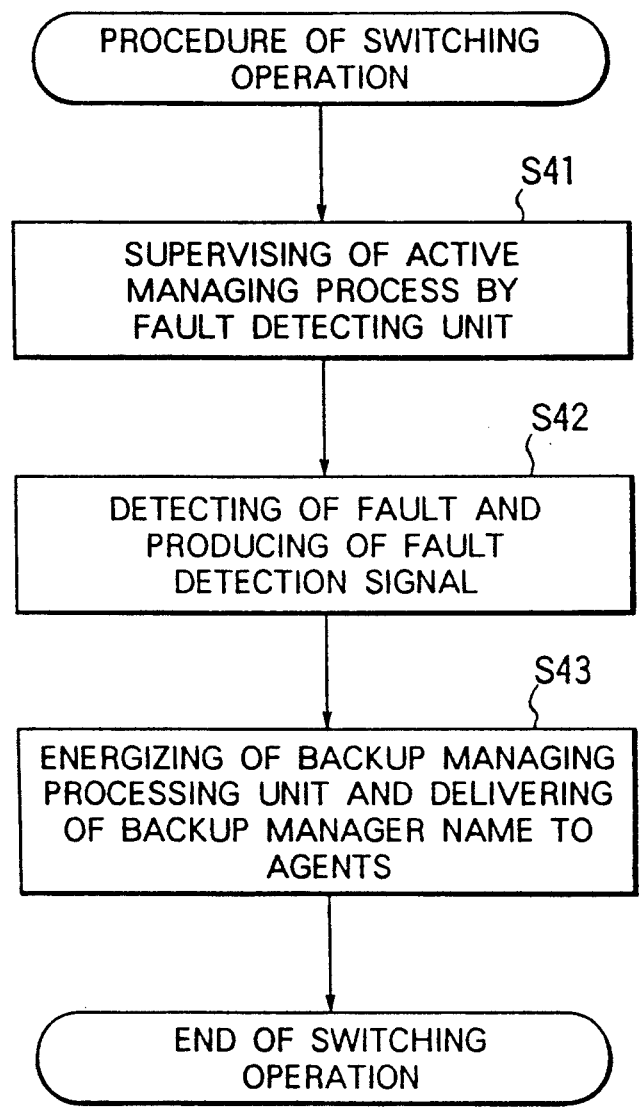
FIG. 4 is a flow chart for describing a manager switching operation of the network management system illustrated in FIG. 1.

Turning to FIG. 4, the description will proceed to operation in a case where the fault occurs in the active manager 10.

In the manner described above, the fault detecting unit 12 supervises the active managing processing unit 11 of the active manager 10 (step 41). When a fault occurs in the active managing processing unit 11 of the active manager 10, the fault detecting unit 12 detects the fault to produce the fault detection signal. The fault detection signal is delivered to the backup manager 20 through the active transmitting/receiving unit 13 and the circuit switching device 40 (a step 42).

On reception of the fault detection signal through the backup transmitting/receiving unit 22, the energizing unit 23 energizes the backup managing processing unit 21. When the backup managing processing unit 21 is energized, the backup managing processing unit 21 produces the name signal representative of the backup manager name as the indicated name. The name signal is delivered to the first through the N-th agents 30-1 to 30-N through the backup transmitting/receiving unit 22 and the circuit switching device 40. The name signal is supplied to the n-th agent processing unit 31-n through the n-th agent transmitting/receiving unit 32-n. Supplied with the name signal, the n-th agent processing unit 31-n renews the n-th memory unit 35-n by using the n-th manager name referring/renewing unit 34-n so as to store the indicated name as the stored manager name (step 43).

According to the above-mentioned procedure, a switching operation from the active manager 10 to the backup manager 20 comes to an end. Thereafter, the n-th agent 30-n continues the management operation for the n-th management object 33-n so as to regard the backup manager 20 as a new active manager as illustrated in whole of FIG. 3.

While this invention has thus far been described in conjunction with only one preferred embodiment thereof, it will now readily be possible for those skilled in the art to put this invention. For example, the active manager, the backup manager, and the first through the N-th agents may be connected by other switching networks such as a packet switching network, a public switching network, and a LAN.

What is claimed is:

1. A network management system, comprising:

first through N-th agents, each of which carries out a management operation on a management object, where N represents a predetermined natural number which is not less than two;

an active manager for managing said first through said N-th agents; and a backup manager for managing said first through said N-th agents, whenever a fault occurs in said active manager, and wherein:

said active manager includes fault detecting means for detecting said fault in said active manager to produce a fault detection signal, said backup manager includes delivering means supplied with said fault detection signal for delivering, in response to said fault detection signal, a name signal representative of a backup manager name, assigned to said backup manager as an indicated name to said first through said N-th agents, and each of said first through said N-th agents comprising:

storing means for preliminarily storing an active manager name assigned to said active manager as a stored manager name and for storing, as said stored manager name, said indicated name when supplied with said name signal; and sending means connected to said storing means for sending management information to one of said active and said backup managers which is assigned with said stored manager name.

2. A network system as claimed in claim 1, wherein said first through said N-th agents, said active manager, and said backup manager are connected to a switching network for transmitting said fault detection signal from said active manager to said backup manager and for transmitting said name signal from said backup manager to said first through said N-th agents.

* * * * *